United States Patent
Mitchell

[15] 3,661,170
[45] May 9, 1972

[54] AIR START SYSTEM FOR AIRPLANES
[72] Inventor: Robert W. Mitchell, Houston, Tex.
[73] Assignee: Stewart & Stevenson Services, Inc., Houston, Tex.
[22] Filed: Dec. 2, 1970
[21] Appl. No.: 94,377

[52] U.S. Cl.................137/351, 137/355.17, 137/355.2, 141/388
[51] Int. Cl..............................................B67d 5/36
[58] Field of Search............137/351, 355.16, 355.17, 355.2, 137/615; 285/61; 141/387, 388; 182/157

[56] References Cited

UNITED STATES PATENTS

| | | | |
|---|---|---|---|
| 2,948,306 | 8/1960 | Kuraeff | 137/351 X |
| 3,053,351 | 9/1962 | Fulcher | 182/157 X |
| 3,399,909 | 9/1968 | Ambrose | 141/388 X |
| 3,439,700 | 4/1969 | Preston | 137/351 |

Primary Examiner—M. Cary Nelson
Assistant Examiner—David R. Matthews
Attorney—James F. Weiler, Jefferson D. Giller, William A. Stout, Paul L. De Verter, II, Dudley R. Dobie, Jr. and Henry W. Hope

[57] ABSTRACT

A pair of air lines including rigid portions connected together in the form of a pantograph adapted to be carried by a vehicle in a retracted position and extended for use and having a flexible air hose connected to each end of the outer ends of the rigid portions for connection to the airplane to provide air for starting the airplane engines. A self-propelled vehicle having an air generating means and a pivoting air manifold connected to and carrying a pair of air lines including a plurality of rigid portions connected together in the form of a pantograph with means for pivoting the air manifold and means for expanding the pantograph towards an airplane and retracting the pantograph towards the vehicle for carrying with flexible air hoses connected to the outer ends and casters on one side of the pantograph for supporting the air hoses as they move along the ground.

10 Claims, 7 Drawing Figures

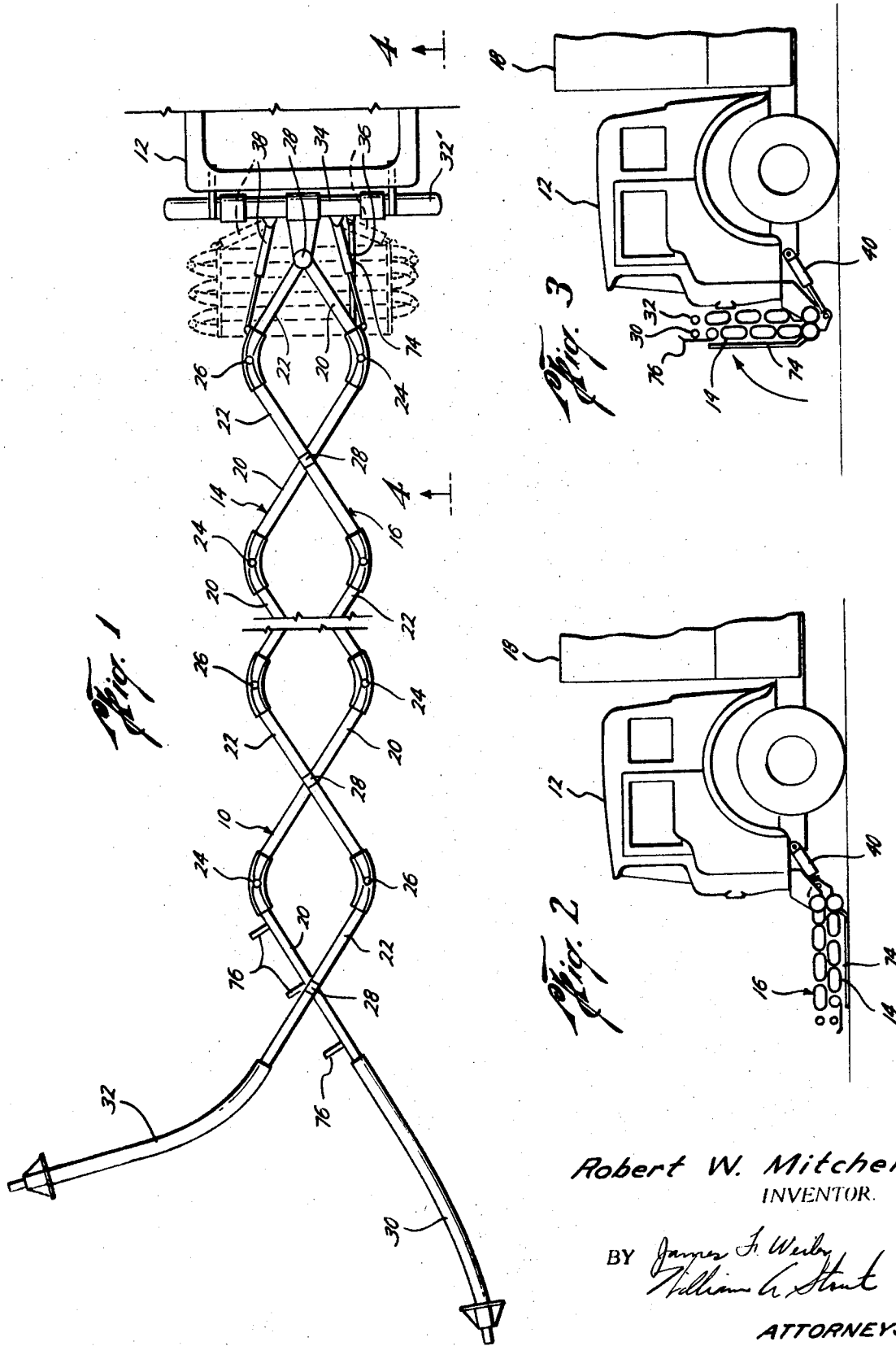

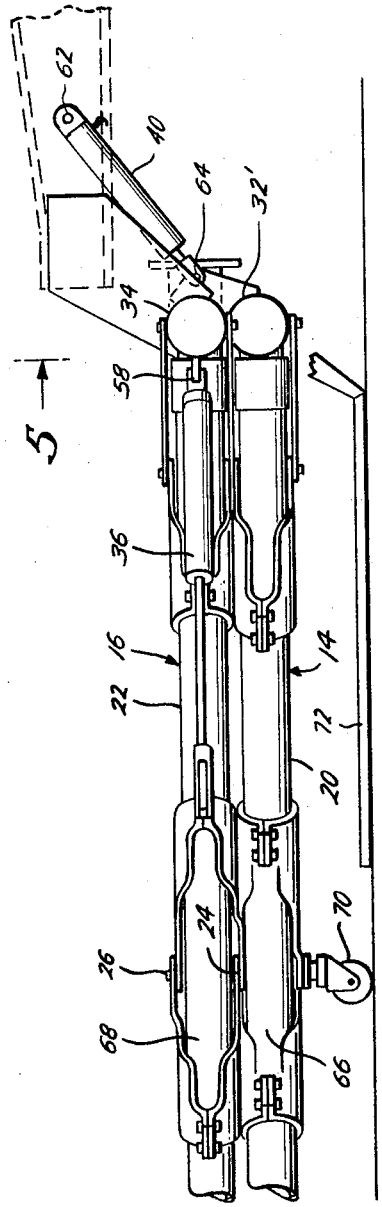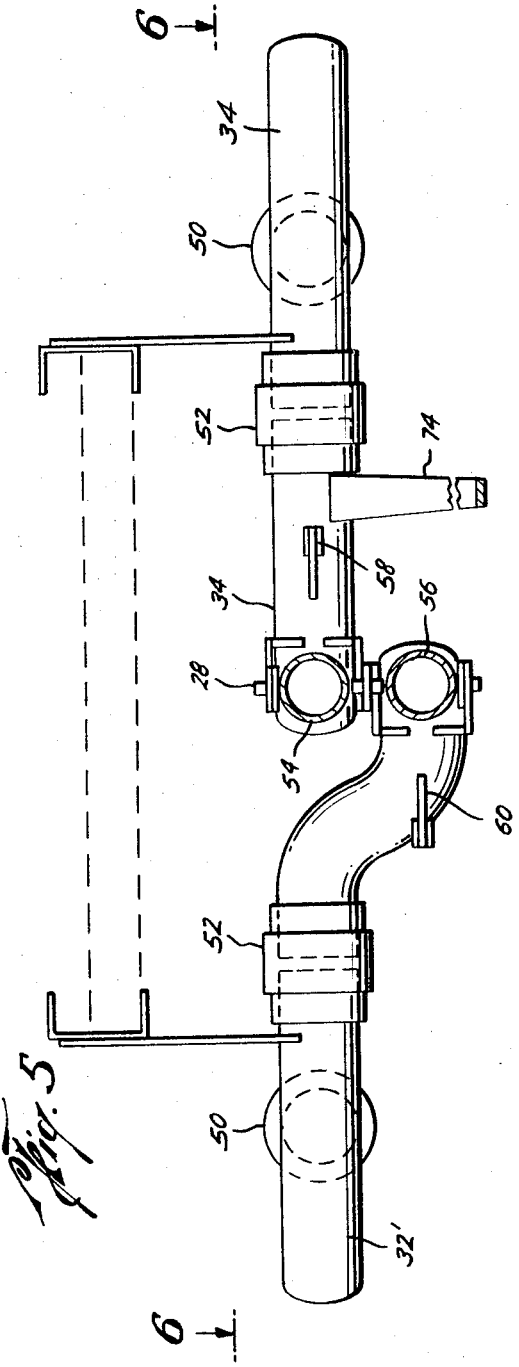

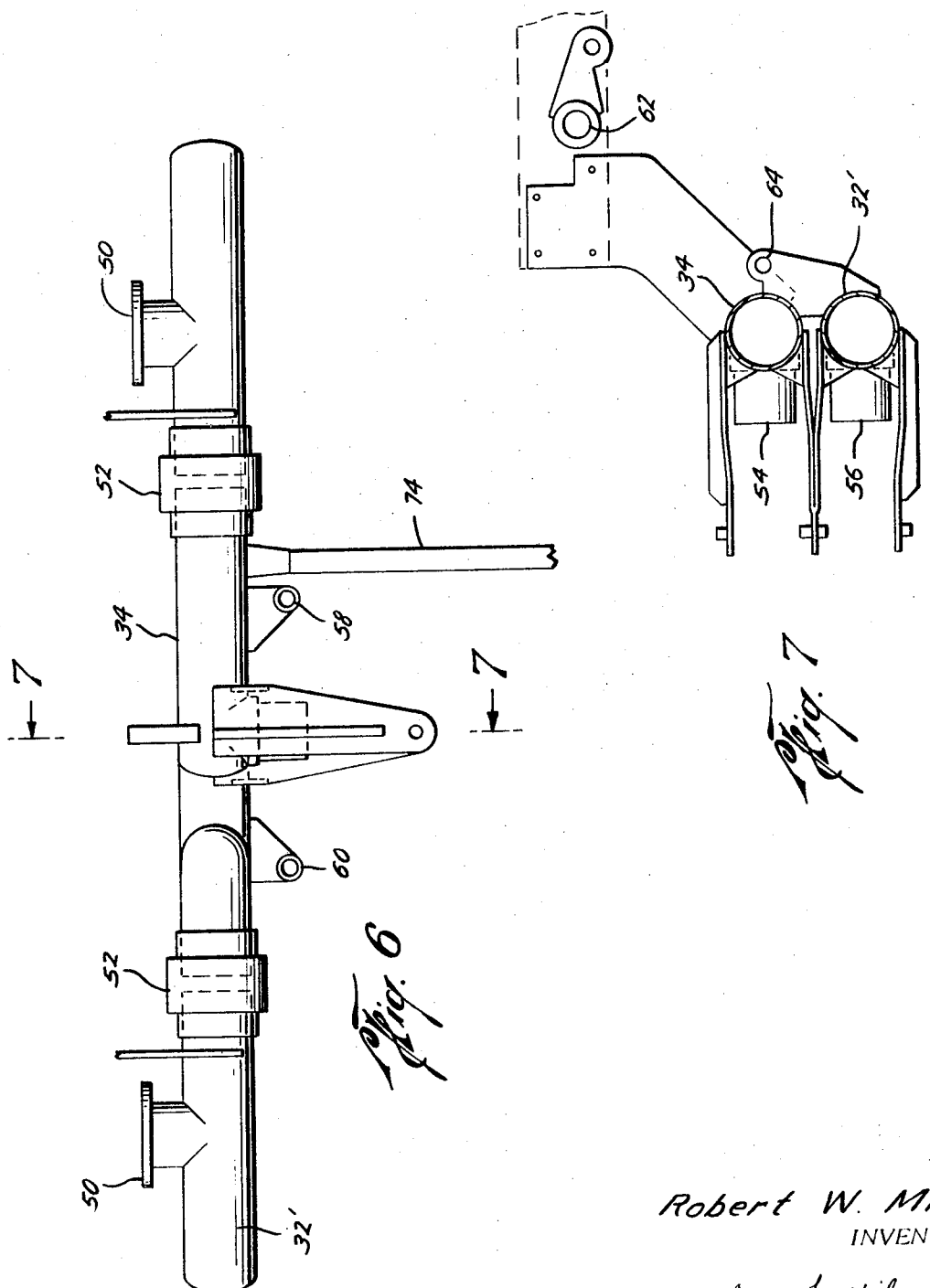

3,661,170

1

AIR START SYTEM FOR AIRPLANES

BACKGROUND OF THE INVENTION

It is common to start jet engines on an airplane by attaching a flexible air hose thereto and starting the engine from an auxiliary supply of air. However, in the past, the hoses have been manually manipulated and because they are heavy and bulky have presented difficulty in handling.

The present invention is directed to an improvement in an air start hose system which includes a pair of air lines that can be carried by a vehicle and mechanically expanded and retracted for ease of handling.

SUMMARY OF THE INVENTION

The present invention relates to an airplane start system having a pair of lines for providing starting air for an airplane in which the pair of lines include a plurality of rigid portions connected together in the form of a pantograph with means for expanding and retracting the pantograph with a flexible air line connected to each of the outer ends of the rigid portions for connection to the airplane for supplying air for starting the engines.

A further object of the present invention is the provision of a pair of air lines having a plurality of rigid portions connected together in the form of a pantograph and connected to a horizontally positioned air manifold pivotly carried by a vehicle with means for pivoting the air manifold and expanding the pantograph towards the airplane with a flexible air line connected to the outer ends of each of the rigid portions of the air lines and retracting the pantograph for carrying by the vehicle.

A further object of the present invention is the provision of a self-propelled vehicle having an air generating means connected to a pivotable manifold to which is connected a plurality of rigid air lines pivotly connected together in the form of a pantograph with piston and cylinder means for rotating the manifold and piston and cylinder means for expanding and retracting the rigid air lines so that the air hoses may be retracted for transportation on the vehicle and may be expanded and directed towards an airplane for providing air power for starting the engines.

Still a further object is the provision of a pair of air lines connected together in the form of a pantograph with coasters on one side of the pantograph for moving along a line for ease of travel over the ground.

Other features and advantages will be apparent from the following description of the presently preferred embodiment.

BRIEF DESCRIPTION OF THE DRAWINGS

FIG. 1 is a fragmentary elevational view, partly in section, illustrating the air start hose system in extended position in solid outline for providing air to the engines of an airplane and showing the air hoses in a partially retracted position in dotted outline, FIG. 2 is a fragmentary schematic side elevational view showing the air start hose system of the present invention on the ground and retracted towards the carrying vehicle, FIG. 3 is a view similar to FIG. 2 showing the air hose start system elevated off of the ground and in position for transporting by the vehicle, FIG. 4 is an enlarged fragmentary side elevational view illustrating the details of the hose retracting mechanism of the present invention, FIG. 5 is a cross-sectional view taken along the line 5—5 of FIG. 4, FIG. 6 is a cross-sectional view taken along the line 6—6 of FIG. 5, and FIG. 7 is a cross-sectional view taken along the line 7—7 of FIG. 6.

DESCRIPTION OF THE PREFERRED EMBODIMENT

Referring now to the drawings and particularly to FIG. 1, the reference numeral 10 generally indicates the air start system of the present invention and generally includes a vehicle 12 adapted to carry a pair of air lines 14 and 16 for supplying air to start the jet engines of an airplane.

The vehicle 12 is preferably a self-propelled vehicle such as a truck for supporting the hoses 14 and 16 and preferably includes a conventional air generating means 18 for providing a self-contained and self-propelled unit.

The air lines 14 and 16 each include a plurality of rigid portions 20 and 22, respectively, which are pivotly connected together at points 24 and 26, respectively. In addition, the rigid portions 20 and 22 are pivotly connected to each other at points 28 to form a pantograph whereby the pantograph may be easily extended as shown in the solid outline in FIG. 1 or retracted as shown in the dotted outline in FIG. 1 and as shown in FIG. 2. In addition, a flexible air line 30 and 32 is connected to each of the outer ends of the rigid portions 20 and 22, respectively, for connection to the airplane engine to be started.

An air manifold 32' is provided carried by the vehicle 12, preferably in a horizontal position, and includes a pivoting portion 34 which receives air from the air generating means 18 and supplies air to the lines 14 and 16. Piston and cylinder assemblies 36 and 38, preferably hydraulic, are provided connected between the pivoting manifold 34 and the lines 14 and 16, respectively, for extending and retracting the lines 14 and 16 and thus the air lines 14 and 16 may easily be and mechanically actuated and the operator need only handle the short flexible hose connections 30 and 32 in making a connection and this connection from the airplane engines.

And as best seen in FIG. 3 a piston and cylinder assembly 40, preferably hydraulic, is provided to rotate the pivoting manifold 34 and thus the air lines 14 and 16 from a horizontal folded position (FIG. 2) to a vertical folded position (FIG. 3) for ease of carrying by the vehicle 12 to the desired location at which time the air lines 14 and 16 may be again rotated about the manifold into a horizontal position for extension. Therefore, the air hoses 14 and 16 may be mechanically retracted and folded into a carrying position and extended into an operating position all without requiring the manual effort required to move the heavy and bulky air hoses which are normally three or four lines.

The details of construction are better seen referring to FIGS. 4-7. Thus the air manifold 32' is supported from the vehicle 12 and receives air through inlets 50 from the air generating means 12 (FIGS. 2 and 3). The pivoting or rotating manifold 34 is connected to the stationary manifold 32' by rotatable couplings 52, thereby allowing the rotating manifold 34 to rotate the air lines 14 and 16 from a vertical carrying position on the vehicle 12 to a horizontal operating position.

It is noted that the rotating manifold 34 has outlets 54 and 56 positioned one above the other for connection to the air lines 16 and 14, respectively, and the rotating manifold 34 includes pivoting supports 58 and 60 connected thereto and in the plane of the lines 16 and 14, respectively, for supporting one end of the piston and cylinder assemblies 36 and 38, respectively.

Referring to FIGS. 4 and 7, the pivoting support, for the piston and cylinder assembly 40 is best seen in which one support 62 is connected to the frame of the vehicle 12 and the second support 64 is connected to the pivoting manifold for rotating and pivoting manifold 34 and the air lines 14 and 16 from the position shown in FIG. 2 to the position shown in FIG. 3 and reversing the movement.

Referring now to FIG. 4, it is noted that while the air lines 14 and 16 must include rigid portions 20 and 22, respectively, pivoted together at pivot points 24 and 26, respectively, to provide the pantograph movement, a flexible air hose connection 66 and 68 is provided between adjacent rigid portions 20 and 22, respectively, to allow flexing at the movable joints. In addition, a plurality of coasters or rollers are provided on the bottom of air line 14 such as coaster 70 to allow the pantograph to be easily moved along the ground 72.

And referring to FIGS. 2, 3, 5 and 6, a support arm 74 is provided connected to the rotating manifold for supporting the retracted air lines 14 and 16 against the vehicle 12 in a carrying position as well as supporting the air lines 14 and 16 as they are rotated between a horizontal and vertical position shown in FIGS. 2 and 3 for keeping the strain off of the pivoting joints 24, 26 and 28. In addition, as best seen in FIGS. 1 and 3, a plurality of supports 76 may be connected to the outer rigid portion 20 of the air line 14 for holding the flexible hoses 30 and 32 in the retracted position against the vehicle 12, as best seen in FIG. 3, when not in use.

In use, the air hoses 14 and 16 are carried in the retracted position as shown in FIG. 3 and the vehicle 12 may travel to the location of the airplane to be started. The piston and cylinder assembly 40 is then suitably actuated to rotate the pivoting manifold 34 to rotate the pantograph from the vertical position of FIG. 3 to the horizontal shown in FIG. 2. Piston and cylinder assemblies 36 and 28 may then be actuated to automatically extend the air lines 14 and 16 until the flexible hoses 30 and 32 are in the vicinity of the airplane engine. The operator need only then to connect the flexible hoses 30 and 32 to the airplane engines and the air generating set 18 may be actuated to supply the desired air to start the engines. After the engines are started, the operation is then reversed by disconnecting the flexible air lines 30 and 32, retracting the pantograph and air lines 14 and 16 by actuation of the piston and cylinder assemblies 36 and 38, and then placing the pantograph in the carrying position by operation of piston and cylinder assembly 40. The vehicle 12 can then move to the next location for starting the engines of another airplane.

The present invention, therefore, is well adapted to carry out the objects and attain the ends and advantages mentioned as well as others inherent therein.

What is claimed is:

1. An airplane air start system having a pair of lines for providing starting air for an airplane comprising,
    a carrying vehicle,
    a pair of air lines including rigid portions connected together in the form of a pantograph and carried by the vehicle,
    means for expanding and retracting said rigid portions of the air lines,
    a flexible air line connected to each of the outer ends of the rigid portions of the air lines for connection to the airplane.

2. An airplane air start system having a pair of lines for providing starting air for an airplane comprising,
    a carrying vehicle,
    a pair of air lines including rigid portions connected together in the form of a pantograph,
    an air manifold pivotly carried by the vehicle and connected to one end of the pair of air lines for supporting said air lines on the vehicle,
    a flexible air line connected to each of the outer ends of the rigid portions of the air lines for connection to the airplane.

3. The invention of claim 1 including,
    an air manifold pivotly carried by the vehicle and connected to one end of the pair of rigid air lines.

4. The invention of claim 3 including,
    means for rotating the folder pantograph about the manifold and against the vehicle.

5. The invention of claim 1 including casters on one side of the pantograph formed air lines for moving along the ground.

6. An airplane air start system having a pair of lines for providing starting air for an airplane comprising,
    a carrying vehicle,
    a pair of air lines including a plurality of rigid portions pivotly connected together in the form of a pantograph and carried by the vehicle,
    flexible air hose connections between the adjacent rigid portions,
    a horizontally positioned air manifold pivotly carried by the vehicle and connected to one end of the pair of air lines for supporting said air lines on the vehicle,
    means for pivoting the air manifold,
    means for expanding and retracting said rigid portions of the air lines toward and away from the manifold,
    a flexible air line connected to each of the outer ends of the rigid portions of the air lines for connection to the airplane.

7. The apparatus of claim 6 including,
    casters on one side of the pantograph formed air lines for moving along the ground.

8. The apparatus of claim 6 wherein the means for pivoting the air manifold and the means for expanding and retracting the rigid portions include piston and cylinder means.

9. The apparatus of claim 6 wherein the vehicle is a self-propelled vehicle having an air generating means connected to the manifold.

10. The apparatus of claim 6 including,
    a support arm carried by the pivoting manifold for supporting the pantograph in the retracted position on the vehicle.

* * * * *